United States Patent
Keyse et al.

(10) Patent No.: US 7,216,025 B2
(45) Date of Patent: May 8, 2007

(54) ADAPTIVE PRESSURE CONTROL METHOD FOR SYNCHRONOUS DOWNSHIFTS IN A MULTIPLE-RATIO TRANSMISSION

(75) Inventors: Brian Keyse, Farmington Hills, MI (US); Steve Cicala, Dearborn Heights, MI (US); Ihab Soliman, Dearborn, MI (US); Charles Suter, South Lyon, MI (US); Kurt Nickerson, Farmington, MI (US); Bradley Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 471 days.

(21) Appl. No.: 10/712,861

(22) Filed: Nov. 13, 2003

(65) Prior Publication Data

US 2005/0107936 A1    May 19, 2005

(51) Int. Cl.
*F16H 61/00* (2006.01)
*F16H 61/38* (2006.01)
*G06F 17/00* (2006.01)

(52) U.S. Cl. .................. 701/61; 701/58; 477/68
(58) Field of Classification Search ............... 701/61, 701/58, 59, 57, 60; 477/79, 68, 37, 34; 475/125, 475/121, 127, 128, 129, 269, 303
See application file for complete search history.

(56) References Cited

U.S. PATENT DOCUMENTS

| | | | |
|---|---|---|---|
| 5,553,694 A | 9/1996 | Schulz et al. | |
| 5,722,519 A | 3/1998 | Kirchhoffer et al. | |
| 5,758,302 A | 5/1998 | Schulz et al. | |
| 5,853,349 A * | 12/1998 | Shimada et al. | 477/143 |
| 5,951,615 A * | 9/1999 | Malson | 701/57 |
| 5,957,800 A * | 9/1999 | Oba et al. | 475/119 |
| 6,292,731 B1 | 9/2001 | Kirchhoffer et al. | |
| 6,308,125 B1 * | 10/2001 | Gleason et al. | 701/67 |
| 6,368,249 B1 * | 4/2002 | Hubbard | 477/121 |
| 6,370,463 B1 | 4/2002 | Fujii et al. | |
| 6,577,939 B1 | 6/2003 | Keyse et al. | |
| 6,863,640 B2 * | 3/2005 | Kobayashi et al. | 477/156 |

* cited by examiner

*Primary Examiner*—Thomas Black
*Assistant Examiner*—Christine M. Behncke
(74) *Attorney, Agent, or Firm*—David B. Kelley; Brooks Kushman P.C.

(57) ABSTRACT

An adaptive pressure control method for synchronous downshifts in an automatic transmission that uses pressure actuated friction elements. The method uses characteristic parameters that determine downshift quality for both power-on downshifts and power-off downshifts. Selected measured variables are monitored to detect changes in the parameters. Adjustments for the friction elements are made in response to changes in the measured variables.

34 Claims, 4 Drawing Sheets

ADAPTIVE PRESSURE CONTROL METHOD FOR SYNCHRONOUS DOWNSHIFTS IN A MULTIPLE-RATIO TRANSMISSION

BACKGROUND OF THE INVENTION

1. Field of the Invention

The invention relates to multiple-ratio automatic transmissions for automotive vehicles wherein ratio changes between ratios involves engagement and disengagement of friction elements that establish and disestablish torque flow paths from a torque input member to a torque output member.

2. Background Art

The control of gear elements of multiple-ratio gearing for an automotive vehicle transmission are controlled typically by friction clutches or brakes, hereinafter referred to as torque transfer friction elements, to establish and to disestablish each of several forward driving ratios and one or more reverse ratios. Examples of automotive transmissions of this type are shown in U.S. Pat. Nos. 6,292,731; 5,722,519; 5,553,694; 5,758,302; 6,370,463; and 6,577,939. These transmissions include controls for establishing and disestablishing ratio changes using both nonsynchronous and synchronous engagement and release of the friction elements. An example of a transmission that uses only synchronous ratio changes is disclosed in co-pending U.S. patent application Ser. No. 10/712,071, filed Nov. 13, 2003, by Steve Cicala et al., which is entitled "Adaptive Pressure Control Method For Achieving Synchronous Upshifts In A Multiple-Ratio Transmission", now U.S. Pat. No. 6,994,647. That co-pending patent application is assigned to the assignee of the present invention.

In a transmission characterized by synchronous ratio upshifts and downshifts, the ratio change requires engagement of one friction element as a companion friction element is disengaged. This engagement and disengagement must occur in synchronism. Precise synchronization is required to achieve acceptable shift quality. Precision in the synchronization must be maintained, furthermore, throughout the life of the transmission, notwithstanding the presence of wear of the torque transfer friction elements and changes in environmental conditions, such as temperature changes, lubricant viscosity changes, and changes in coefficients of friction for the friction elements.

Errors in synchronization during ratio changes cause perceptible inertia torque disturbances at a transmission torque output shaft that have an adverse effect on overall shift quality. Shift quality would be affected, for example, if the ratio change were to start as pressure on the oncoming friction element is increased at the start of the event during a synchronous downshift. Other errors in synchronization during a synchronous downshift are slip time errors for the offgoing friction element as the oncoming friction element gains capacity.

SUMMARY OF THE INVENTION

The present invention is a method for controlling a synchronous downshift of a multiple-ratio automotive transmission as torque is transferred from an offgoing friction element to an oncoming friction element.

Like the disclosure of the co-pending patent application identified above, which deals with synchronous upshifts, the present invention includes the use of a controller for adapting measured variables or operating conditions for the transmission friction element so that adjustments can be made continuously throughout the life of the transmission to eliminate errors in calibrated parameters. The errors are measured and stored during each control loop of an electronic microprocessor module of the controller. In the case of a power-on synchronous downshift, the characteristic of the shift that is adapted is the starting pressure of the offgoing friction element. In the case of a power-off synchronous downshift, the controller adapts the starting pressure for the offgoing friction element and the boost time for the oncoming friction element during which pressure is boosted at the outset of a downshift event.

The controller used in practicing the present invention follows a priority schedule for correcting errors in the parameters that affect synchronous downshift quality. If multiple errors are detected, the priority schedule of the control method will determine which error is corrected first.

DETAILED DESCRIPTION OF AN EMBODIMENT OF THE INVENTION

Figure 1:
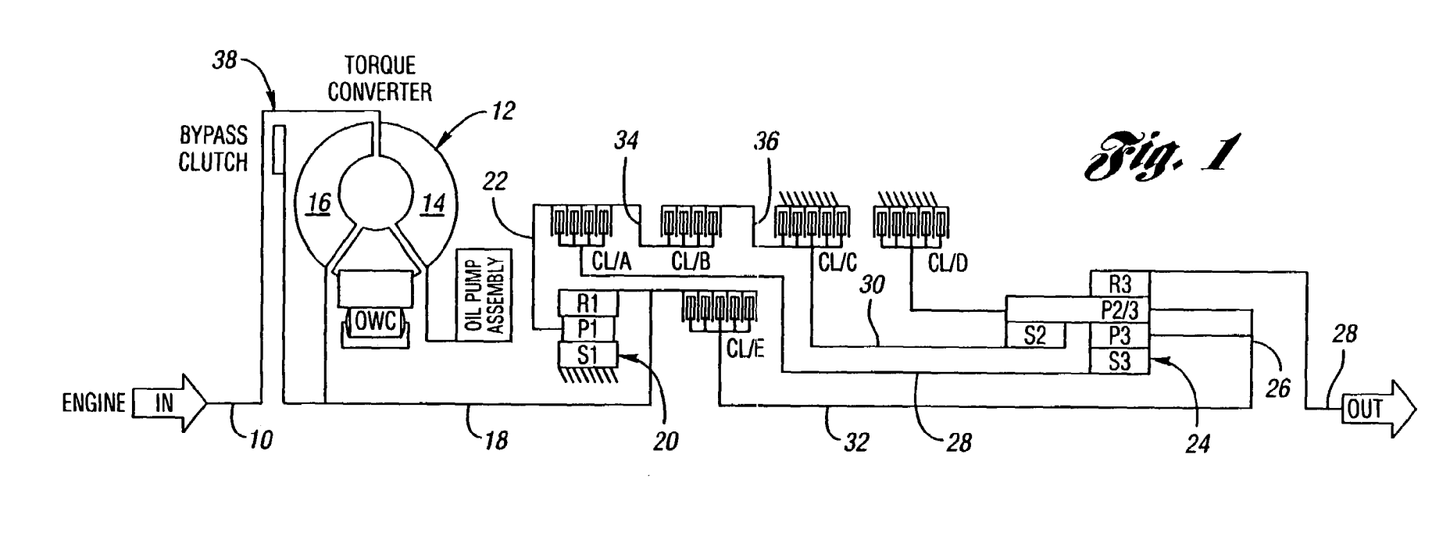
FIG. 1 is a schematic diagram of a gearing arrangement for a transmission capable of embodying the downshift adaptive control of the present invention.
Figure 2:
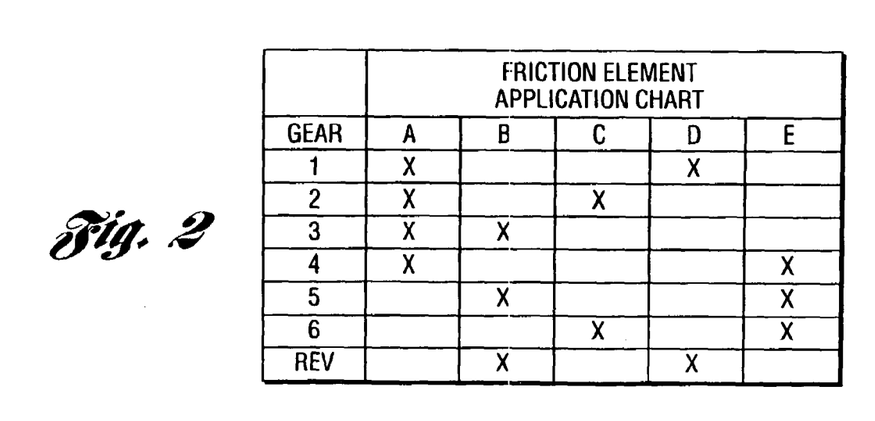
FIG. 2 is a chart showing the clutch and brake friction element engagement and release pattern for establishing each of six forward driving ratios and a single reverse ratio for the transmission schematically illustrated in FIG. 1.

The transmission schematically illustrated in FIG. 1 is an example of a multiple-ratio transmission capable of being controlled using the method of the invention, wherein ratio changes are controlled by friction elements acting on the individual gear elements. Engine torque from the vehicle engine is distributed to torque input element 10 of hydrokinetic torque converter 12. Impeller 14 of the torque converter 12 develops turbine torque on turbine 16 in known fashion. Turbine torque is distributed to turbine shaft 18.

The transmission of FIG. 1 includes a simple planetary gearset 20 and a compound planetary gearset 24. Gearset 20 has a permanently fixed sun gear S1, a ring gear R1 and planetary pinions P1 rotatably supported on carrier 22. Turbine shaft 18 is drivably connected to ring gear R1.

Compound planetary gearset 24, sometimes referred to as a Ravagineaux gearset, has a small pitch diameter sun gear S3, a torque output ring gear R3, a large pitch diameter sun gear S2 and compound planetary pinions. The compound planetary pinions include long pinions P 2/3, which drivably engage short planetary pinions P3 and torque output ring gear R3. Long planetary pinions P 2/3 also drivably engage short planetary pinions P3. Short planetary pinions P3 also engage sun gear S3.

The planetary pinions of gearset 24 are rotatably supported on compound carrier 26.

Ring gear R3 is drivably connected to torque output shaft 28, which is drivably connected to vehicle traction wheels, not shown, through a differential-and-axle assembly.

Gearset 20 is an underdrive ratio gearset arranged in series disposition with respect to compound gearset 24. During operation in the first four forward driving ratios, carrier P1 is drivably connected to sun gear S3 through shaft 28 and forward clutch A. During operation in the third ratio, fifth ratio and reverse, direct clutch B drivably connects carrier 22 to shaft 30, which is connected to large pitch diameter sun gear S2.

During operation in the fourth, fifth and sixth forward driving ratios, overdrive clutch E connects turbine shaft 18 to compound carrier 26 through shaft 32.

Friction element C acts as a reaction brake for sun gear S2 during operation in second and sixth forward driving ratios.

During operation of gearset 24 indirect ratio (third ratio), direct clutch B is applied together with forward clutch A. The elements of gearset 24 then are locked together to effect a direct driving connection between shaft 32 and output shaft 28.

If clutch B is applied during third ratio operation when clutch A is applied and clutch C is released, a downshift from the third ratio to the second ratio would be effected as clutch C is applied in synchronism with release of clutch B.

If clutch B is applied during third ratio operation when clutch A is applied and clutch B is released, an upshift from the third ratio to the fourth ratio would be effected as clutch E is applied in synchronism with release of clutch B.

The torque output side of forward clutch A is connected through torque transfer element 34 to the torque input side of direct clutch B, during forward drive. The torque output side of direct clutch B, during forward drive, is connected to shaft 30 through torque transfer element 36.

Reverse drive is established by applying low-and-reverse brake D and clutch B.

For purposes of the present description, any clutch or brake that is involved in a synchronous downshift will be referred to as an oncoming friction element if it is being applied. If it is being released, it will be referred to as an offgoing friction element. The term "friction element" will apply to either a brake or a clutch.

Typically, a transmission of this type would include a lockup or torque converter bypass clutch, as shown at 38, to directly connect turbine shaft 18 to the engine crankshaft after a torque converter torque multiplication mode is completed and a hydrokinetic coupling mode begins.

For the purpose of illustrating one example of a synchronous ratio downshift for the transmission of FIG. 1, it will be assumed that a downshift will occur between the fourth ratio and the third ratio. On such a 4–3 downshift, friction element B is applied and friction element E is released as friction element A remains applied. Another example of a synchronous ratio downshift would be a downshift from the third ratio to the second ratio. On a 3–2 downshift, friction element C would be applied and, friction element B would be released as friction element A remains applied. Each of these downshifts involves an offgoing friction element and an oncoming friction element.

The synchronous downshift adaptive pressure control calibration, illustrated in FIGS. 3a, 3b, 6a and 6b, can refer to any one of the offgoing clutches and any one of the oncoming clutches.

Consistent, smooth and durable synchronous downshifts for the transmission are achieved using a downshift algorithm of the controller, which adapts the offgoing starting pressure. This is the most important characteristic or parameter for a synchronous downshift in a transmission of this type. The algorithm uses three variables to calculate-starting pressure adjustments. These variables include incipient ramp time at the start of the downshift event. Incipient ramp is the ramping down of offgoing starting pressure for the offgoing friction element. The ramping occurs if the ratio change at the start of the downshift event does not begin within the certain calibrated amount of time. This condition indicates that the offgoing starting pressure for the offgoing friction element is too high. This parameter has the highest priority in the control of a downshift. Another parameter, or shift characteristic, is the extrapolated slip time, which measures the overall duration of a power-on synchronous downshift. This has the next highest priority. A third parameter, or shift characteristic, is the initial slip time during a downshift event. That parameter, which has the least priority, is a measure of the duration between the start of a ratio change, when ratio progression is zero, and a predetermined amount of slip at the beginning of a shift event. This parameter is intended to estimate the rate at which the ratio change is beginning.

Figure 5:
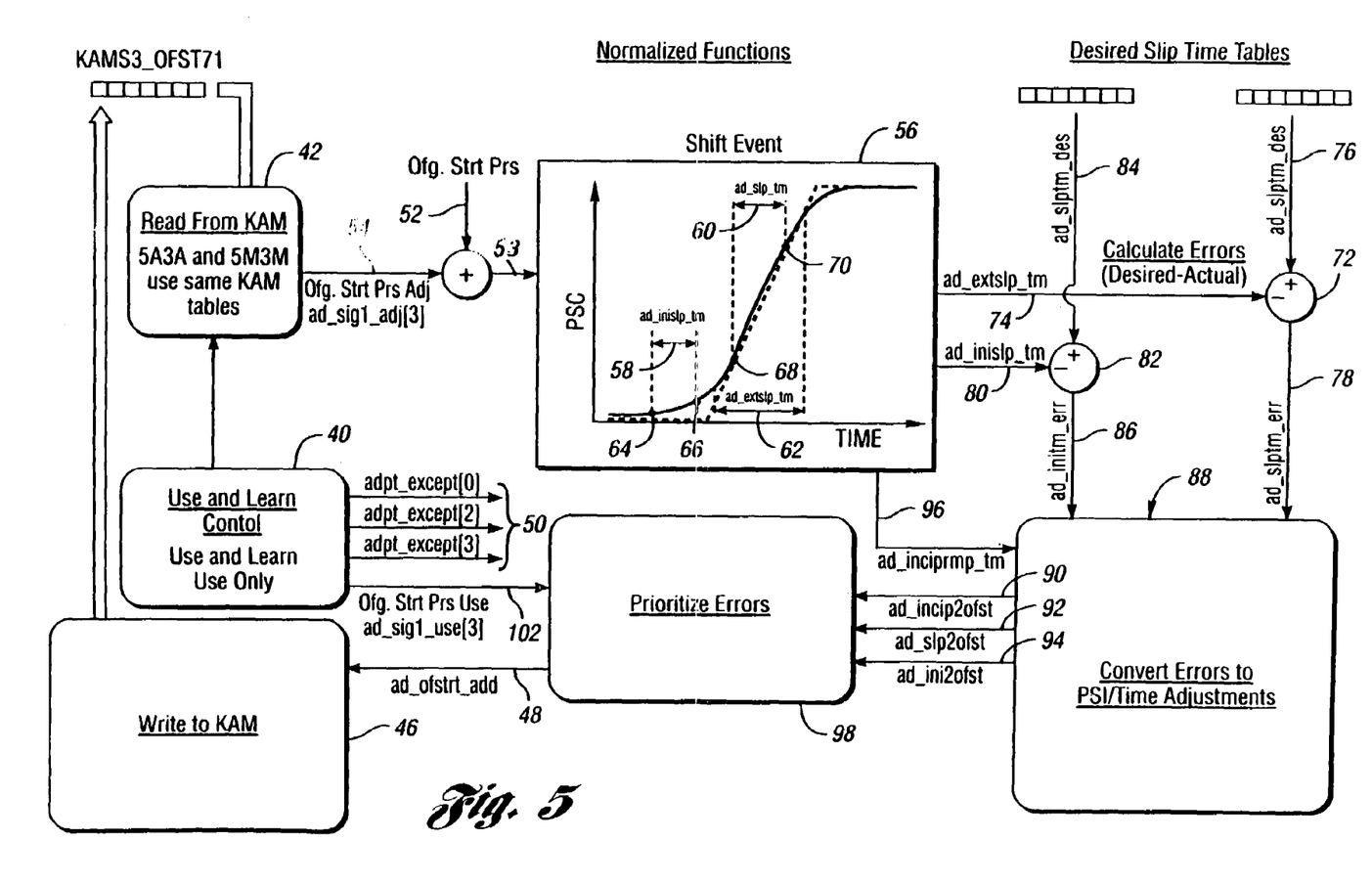
FIG. 5 is a schematic diagram of the synchronous downshift adaptive pressure control architecture for the controller for the transmission of FIG. 1.

The controller-block diagram of FIG. 5 shows the process flow for the method of the invention. It illustrates schematically how the control algorithm adapts the parameters for a synchronous downshift. It includes a "use and learn" control module 40, which monitors operating conditions or parameters to determine the state of adaptation for a current shift. It controls whether the adaptive values should be read from a keep-alive memory (KAM), shown at 42, and whether writing to KAM 42 is allowed. When writing to KAM 42 is allowed, that condition is referred to as "learning enabled." If the controller is "use enabled," the offgoing starting pressure adjustment for a current shift is used, as shown at 54, during a subsequent shift.

If the controller is "learn enabled," the pressure adjustment that is written to KAM is a pressure adjustment received at action block 46 and delivered to KAM 42. The adjusted value for offgoing friction element starting pressure is delivered to action block 46, as shown at 48. The development of the adjustment to the offgoing friction element starting pressure will be described subsequently.

The three signals at 50 indicate why the adaptive "use enabled" feature or the "learning enabled" feature was off during a current shift.

The offgoing starting pressure during a current shift is received from the transmission controller, as shown at 52 in FIG. 5.

If an offgoing friction element starting pressure adjustment is needed, as indicated at 54, that value is added to the base offgoing friction element starting pressure at 52 and is applied, as shown at 53, to the current shift at shift event module 56, which contains an algorithm representing the relationship between the shift progression, measured in this instance as a percentage shift complete, and time. Using the algorithm at 56, an initial slip time is computed, as shown at 58. Initial slip time is computed using initial shift progression target points 64 and 60. When the offgoing friction element starting pressure is incremented by the offgoing friction element starting pressure adjustment at 54, the slip time is determined as shown at 60. Extrapolated overall slip time for the offgoing friction element also is computed, as shown at 62, using the intermediate shift progression target points 68 and 70.

The controller monitors the information that is developed for the shift event at 56 and delivers an extrapolated slip time value to summing point 72, as shown at 74. The extrapolated slip time value is compared to a calibrated desired slip time stored in memory in the form of desired slip time tables. The desired slip time at 76 and the extrapolated slip time value at 74 result in a slip time error, as shown at 78, which is the algebraic difference in the values at 74 and 76.

The initial slip time monitored at 56 is distributed, as shown at 80, to a comparator, or summing point, 82. A desired initial slip time, obtained from the desired slip time tables, is transmitted, as shown at 84, to the summing point 82 to produce an algebraic sum which represents initial slip time error at 86.

The desired initial slip time at 84 and a desired overall slip time at 76 are based on current shift conditions.

Computation unit 88 of the controller converts the slip time errors at 78 and 86 to pressure and slip time adjustments. The conversion of incipient ramp time error to offgoing starting pressure, measured in psi, is indicated at 90. The conversion of overall slip time error to offgoing starting pressure, measured in psi, is indicated at 92. The conversion of initial slip time error to offgoing starting pressure, measured in psi, is indicated at 94.

The conversion of incipient ramp time to an offgoing starting pressure adjustment is monitored by the shift event module 56, as indicated at 96. The incipient ramp, as will be explained with reference to FIG. 3*a*, is a ramping down of the offgoing friction element starting pressure that takes place if the shift has not started during a shift event within a calibrated time period.

The values that are developed at 92 and 94 result in an offgoing friction element starting pressure adjustment 48, which was previously described. A prioritizing schedule is stored in memory portion 98. This comprises a prioritizing scheme for making a final adjustment at 48 in response to the development of potential adjustments at 90, 92, and 94. The base offgoing friction element starting pressure at 52 is modified by the adjustments at 54 to develop the adjusted actual value of the offgoing friction element starting pressure at 53. The "use and learn" status for, offgoing starting pressure for downshifts is shown at 102.

Figure 3A:
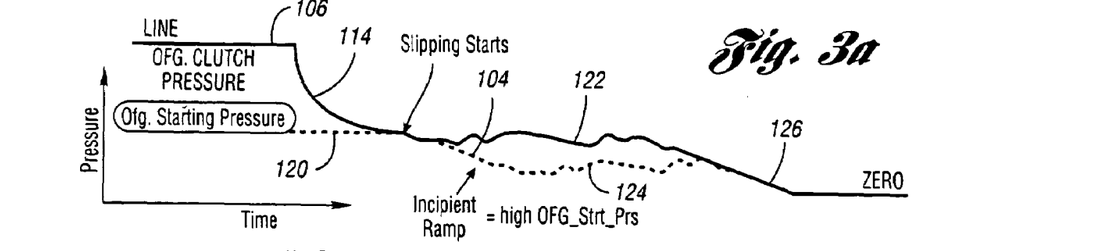
FIG. 3a is a time plot for an offgoing friction element pressure during a "power on" synchronous downshift.
Figure 3B:
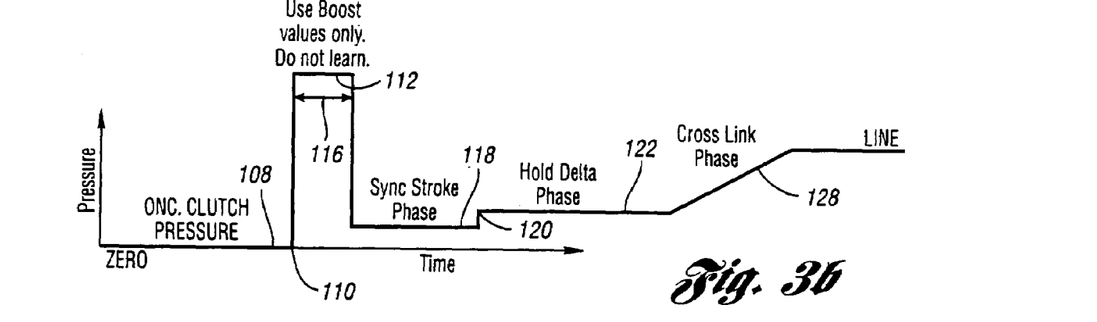
FIG. 3b is a time plot for the pressure on the oncoming friction element during a "power on" synchronous downshift.

FIGS. 3*a* and 3*b* show the parameters, or the characteristics, of a power-on downshift for the transmission of FIG. 1. The measured conditions that are needed to determine the amount of error in the offgoing friction element starting pressure include detection of an incipient ramp of the offgoing friction element starting pressure, shown at 104 in FIG. 3*a*.

At the beginning of a power-on downshift, the offgoing friction element pressure is at a high value, as shown at 106. The oncoming friction element pressure is at zero, as shown at 108 in FIG. 3*b*. At time 110, in FIG. 3*b*, the oncoming friction element pressure is boosted, as shown at 112, thereby initiating stroking of the friction element pressure actuator. Simultaneously, the pressure on the offgoing friction element begins to decrease, as shown at 114.

The boost pressure on the oncoming friction element continues for a boost time 116. This initiates a stroke phase, as shown at 118.

At time 120, the pressure on the oncoming friction element is increased slightly to a delta value during a so-called hold delta phase 122.

If the controller determines that the shift has not started following reduction of the offgoing friction element pressure to the value at 120, the offgoing friction element starting pressure is ramped down. This is shown, as previously indicated, at 104.

If ramping down to effect the incipient ramp at 104 is not needed, closed-loop control begins, as shown at 122. If the incipient ramp is necessary to initiate the start of a shift, closed-loop control of the offgoing friction element starting pressure takes place as shown at 124. At the end of closed-loop control, the offgoing friction element starting pressure is reduced, as shown at 126, simultaneously with an increase in the oncoming friction element clutch pressure, as shown at 128.

Figure 4A:
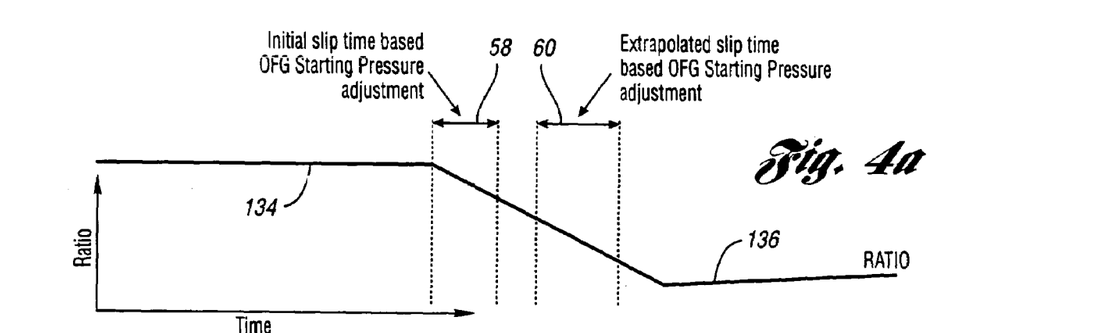
FIG. 4a is a time plot illustrating a ratio change when the downshift of FIGS. 3a and 3b is commanded.
Figure 4B:
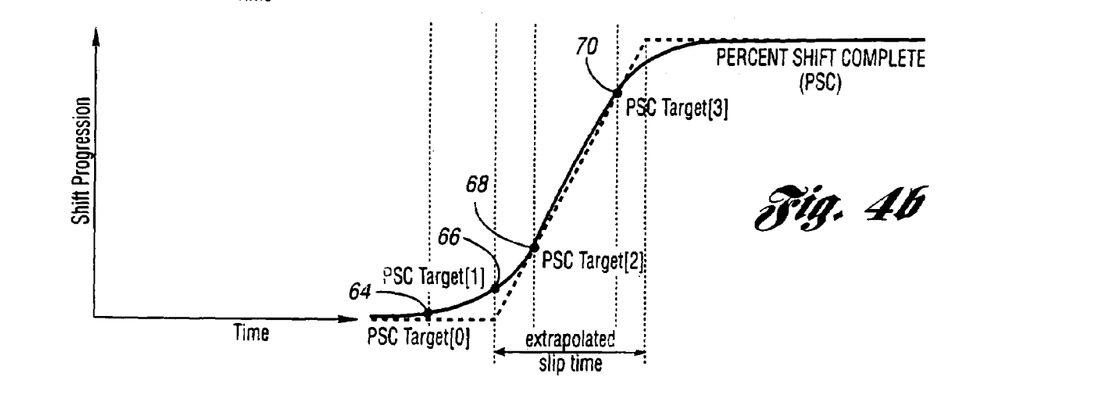
FIG. 4b is a time plot of the shift progression during the synchronous downshift of FIGS. 3a and 3b.

The measured conditions include also measurement of the extrapolated slip time, shown at 60 in FIGS. 4*a* and 4*b*, and the initial slip time, shown at 58 in FIGS. 4*a* and 4*b*. The incipient ramp measured condition has the highest order of priority, the extrapolated slip time 60 has the next highest priority, and the initial slip time 58 has the lowest priority.

FIG. 4*a* shows a ratio change from a first ratio at 134 to a second ratio at 136 during a synchronous downshift with power-on. FIG. 4*b* is a plot of the shift progression during the downshift shown at FIG. 4*a*. This is an enlarged view of the plot shown in the shift event control module 56 in FIG. 5.

FIGS. 6*a*, 6*b*, 6*c*, and 6*e* are plots of the characteristics of a power-off synchronous downshift. As in the case of a power-on synchronous downshift, the pressure on the offgoing friction element is high before the shift event starts, as shown at 134. In the case of the oncoming friction element, the pressure is increased from zero at 136 to a boosted value at 138. The boost time is shown at 140. Simultaneously; the pressure on the offgoing friction element is decreased, as shown at 142, until ultimately it reaches a zero value; as shown at 144. It is important to avoid a pressure boost before the start of a ratio change. This can be controlled by controlling the starting pressure for the oncoming friction element, as shown at 146. If the oncoming friction element starting pressure is too low, it is ramped up aggressively at 148. If aggressive ramping is not needed, the pressure is increased using closed-loop control, as shown at 150.

One of the measured conditions used during adaptation of a power-off downshift is a so-called controller effort during closed-loop control. A typical trace for pressure on the friction element involved in closed-loop control is shown for a power-on downshift at 122 in FIG. 3*a*. The controller effort is the integral of the pressure values with respect to time during the time pressure is being controlled. That is schematically shown at 150 in FIG. 6*b*. The trace will have upward fluctuations and downward fluctuations during the closed-loop control period. The total area defined by the fluctuations represents the controller effort. A positive controller effort equals the integrated area under the upward fluctuations. A negative controller effort equals the integrated area above the downward fluctuations.

Figure 6A:
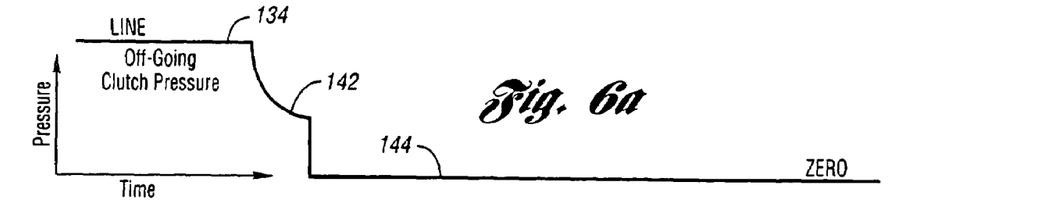
FIG. 6a is a time plot for the offgoing friction element during a "power-off" downshift of the transmission of FIG. 1.
Figure 6B:
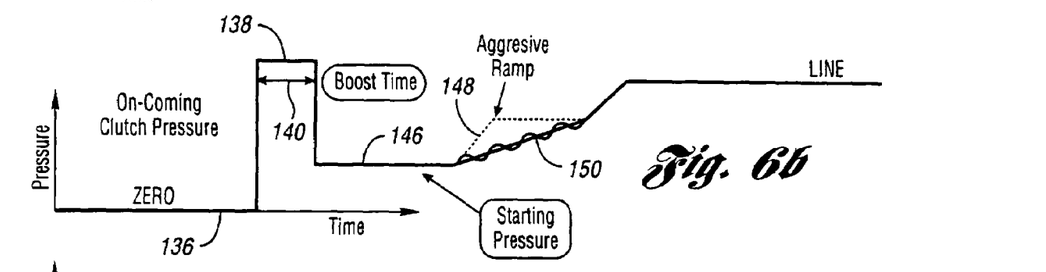
FIG. 6b is a time plot of the pressure on the oncoming friction element during a "power-off" synchronous downshift.
Figure 6C:
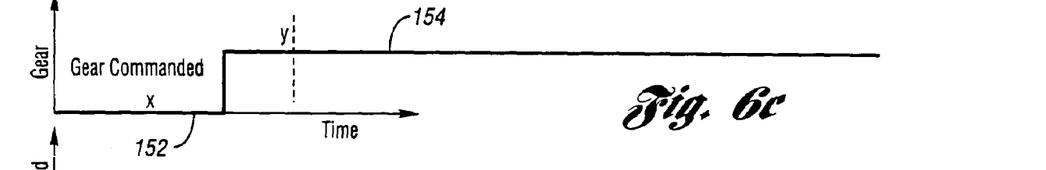
FIG. 6c is a time plot showing a change in ratio when the synchronous downshift of FIGS. 6a and 6b for the transmission of FIG. 1 is commanded.
Figure 6D:
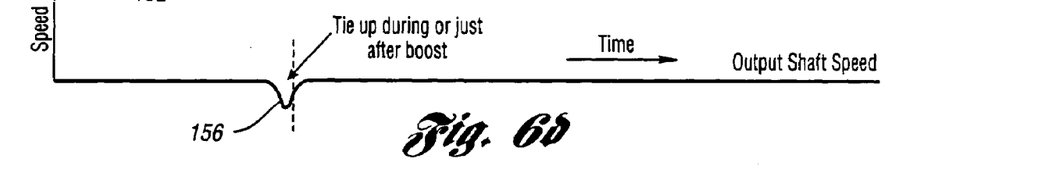
FIG. 6d is a time plot for the output shaft speed during a "power-off" synchronous downshift event.
Figure 6E:
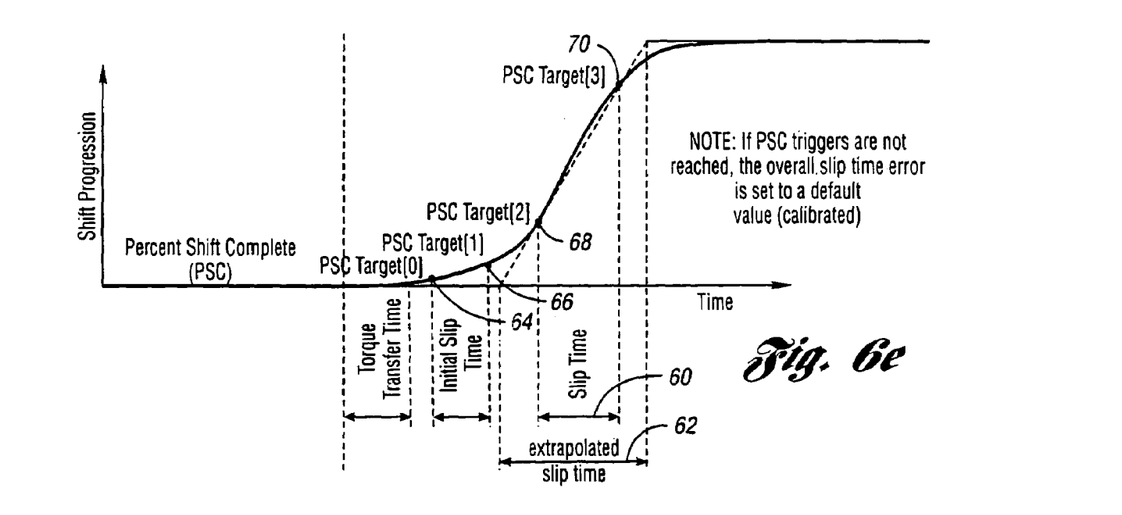
FIG. 6e is a time plot showing shift progression for the power-off synchronous downshift of FIGS. 6a and 6b.

FIG. 6*c* shows the change in the commanded gear from a gear ratio 152 to a gear ratio 154, which represents a downshift. If the boost at 138 occurs during or close to the start of a ratio change, a tie up will be developed, as shown at 156 in FIG. 6*d*. FIG. 6*d* is a time plot of the output shaft speed. The tie up condition evidenced by the dip 156 results in an-inertia disturbance on the output-shaft which is perceptible. FIG. 6*e* is a time plot of the shift progression for the shift of FIG. 6*c*.

The measured conditions that are monitored during a downshift with power-off are indicated in the following priority table:

POWER-OFF PRIORITY TABLE
Non-Sync. Adaptive Prioritization Rules

| Priority | #8A Positive Controller Effort (adds prs) | #8B Neg Controller Effort (removes prs) | #7 Initial Slip Time Error | #6 Slip Time Error | #5 Tie Up Due to Boost (measured at output shaft) | #4 Small Torque Transfer Time Error | #3 Large Torque Transfer Time Error | #2 Aggressive Ramp Reached | #1 Ratio Change Starts During Boost | Characteristic to Adapt | Rationale |
|---|---|---|---|---|---|---|---|---|---|---|---|
| 0 | F | F | F | F | F | F | F | F | F | None | |
| 1 | * | * | * | * | * | * | * | * | T | Reduce Boost Time | Ratio change starting during the boost phase indicates significant over boost. |
| 2 | * | * | * | * | F | F | * | T | F | Inc Onc Strt Prs | Aggressive ramp indicates low starting pressure. Correct this condition before fixing other errors. |
| 3 | * | * | * | * | F | F | T | F | F | Inc/Dec Boost Time | If torque transfer error is large, fix this error before adjusting starting pressure. |
| 4 | * | * | * | * | T | F | T | F | F | Reduce Boost Time by larger of torque transfer error and tie up error | Tie up detection is only used on pseudo sync shifts. However, if it occurs, reduce boost time by the greater of torque transfer error or tie up error. |
| 5 | F | F | F | F | F | T | F | F | F | Inc/Dec Boost Time | Torque transfer error is due to over/under boosting the clutch. |
| 5A | F | T | F | F | F | T | F | F | F | Inc/Dec Boost Time | Torque transfer error is due to over/under boosting the clutch. Negative controller effort indicates too much starting pressure and is independent of the short torque transfer time |
| 5B | T | F | F | F | F | T | F | F | F | Inc/Dec Boost Time | Torque transfer error is due to over/under boosting the clutch. Positive controller effort indicates not enough starting pressure and is independent of the short torque transfer time |
| 6 | F | F | F | F | T | T | F | F | F | Reduce Boost Time by larger of torque transfer error and tie up error | Tie up detection is only used on pseudo sync shifts. However, if it occurs, reduce boost time by the greater of torque transfer error or tie up error. |
| 6A | F | T | F | F | T | T | F | F | F | Reduce Boost Time by larger of torque transfer error and tie up error Dec Onc Strt Prs | Tie up detection is only used on pseudo sync shifts. However, if it occurs, reduce boost time by the greater of torque transfer error or tie up error. Negative controller effort indicates too much starting pressure and is independent of the short torque transfer time |
| 6B | T | F | F | F | T | T | F | F | F | Reduce Boost Time by larger of torque transfer error and tie up error Inc Onc Strt Prs | Tie up detection is only used on pseudo sync shifts. However, if it occurs, reduce boost time by the greater of torque transfer error or tie up error. |
| 7 | F | F | F | T | T | T | F | F | F | Reduce Boost Time by larger of torque transfer error and tie up error | Tie up detection is only used on pseudo sync shifts. However, if it occurs, reduce boost time by the greater of torque transfer error or tie up error. Since the error due to boost is small, can also adjust starting pressure based on slip times. |
| 7A | F | T | F | T | T | T | F | F | F | Inc/Dec Onc Strt Prs Reduce Boost Time by larger of torque transfer error and tie | Tie up detection is only used on pseudo sync shifts. However, if it occurs, reduce boost time by the greater of torque transfer error and tie up error. Since the error due to boost is small, |

-continued

POWER-OFF PRIORITY TABLE
Non-Sync. Adaptive Prioritization Rules

| Priority | #8A Positive Controller Effort (adds prs) | #8B Neg Controller Effort (removes prs) | #7 Initial Slip Time Error | #6 Slip Time Error | #5 Tie Up Due to Boost (measured at output shaft) | #4 Small Torque Transfer Time Error | #3 Large Torque Transfer Time Error | #2 Aggressive Ramp Reached | #1 Ratio Change Starts During Boost | Characteristic to Adapt | Rationale |
|---|---|---|---|---|---|---|---|---|---|---|---|
| | | | | | | | | | | up error Dec Onc Strt Prs by larger of controller effort or slip time adjustment | can also adjust starting pressure based on slip times. Must decrease starting pressure, because with negative controller effort, it is assumed that if the slip time is long the cause is the controller effort taking out too much pressure. If slip time is long, take the larger of controller effort or slip time adjustment since they both indicate too much starting pressure. |
| 7B | T | F | F | T | T | T | F | F | F | Reduce Boost Time by larger of torque transfer error and tie up error | Tie up detection is only used on pseudo sync shifts. However, if it occurs, reduce boost time by the greater of torque transfer error or tie up error. Since the error due to boost is small, can also adjust starting pressure based on slip times. |
| | | | | | | | | | | Inc Onc Strt Prs by larger of controller effort or slip time adjustment | Must increase starting pressure, because with positive controller effort, it is assumed that if the slip time is short the cause is the controller effort adding too much pressure. If slip time is long, take the largest of controller effort or slip time adjustment since they both indicate not enough starting pressure. |
| 8 | F | F | T | F | T | T | F | F | F | Reduce Boost Time by larger of torque transfer error and tie up error | Tie up detection is only used on pseudo sync shifts. However, if it occurs, reduce boost time by the greater of torque transfer error or tie up error. Since the error due to boost is small, can also adjust starting pressure based on the initial slip times. |
| 8A | F | T | T | F | T | T | F | F | F | Reduce Boost Time by larger of torque transfer error and tie up error Inc/Dec Onc Strt Prs | Tie up detection is only used on pseudo sync shifts. However, if it occurs, reduce boost time by the greater of torque transfer error or tie up error. Since the error due to boost is small, can also adjust starting pressure based on the initial slip times. Controller effort has higher priority than initial slip time. |
| 8B | T | F | T | F | T | T | F | F | F | Reduce Boost Time by larger of torque transfer error and tie up error Dec Onc Strt Prs | Tie up detection is only used on pseudo sync shifts. However, if it occurs, reduce boost time by the greater of torque transfer error or tie up error. Since the error due to boost is small, can also adjust starting pressure based on the initial slip times. Controller effort has higher priority than initial slip time. |
| 9 | F | F | T | T | T | T | F | F | F | Reduce Boost Time by larger of torque transfer error and tie up error Inc Onc Strt Prs | Tie up detection is only used on pseudo sync shifts. However, if it occurs, reduce boost time by the greater of torque transfer error or tie up error. Since the error due to boost is small, can also adjust starting pressure based on slip times. |
| 9A | F | T | T | T | T | T | F | F | F | Reduce Boost Time by larger of torque transfer error and tie up error Inc/Dec Onc Strt Prs | Tie up detection is only used on pseudo sync shifts. However, if it occurs, reduce boost time by the greater of torque transfer error or tie up error. Since the error due to boost is small, can also adjust starting pressure based on slip times. Overall slip time has higher priority than initial slip time. |
| | | | | | | | | | | Dec Onc Strt Prs by larger of controller effort or slip time | Must decrease starting pressure, because with negative controller effort, it is assumed that if the slip time is long the cause is the controller effort taking out too |

POWER-OFF PRIORITY TABLE -continued
Non-Sync. Adaptive Prioritization Rules

| Priority | #8A Positive Controller Effort (adds prs) | #8B Neg Controller Effort (removes prs) | #7 Initial Slip Time Error | #6 Slip Time Error | #5 Tie Up Due to Boost (measured at output shaft) | #4 Small Torque Transfer Time Error | #3 Large Torque Transfer Time Error | #2 Aggressive Ramp Reached | #1 Ratio Change Starts During Boost | Characteristic to Adapt | Rationale |
|---|---|---|---|---|---|---|---|---|---|---|---|
| | | | | | | | | | | adjustment | much pressure. If slip time is short, take the larger of controller effort or slip time adjustment since they both indicate too much starting pressure. |
| 9B | T | F | T | T | T | T | F | F | F | Reduce Boost Time by larger of torque transfer error and tie up error. Inc Onc Strt Prs by larger of controller effort or slip time adjustment | Tie up detection is only used on pseudo sync shifts. However, if it occurs, reduce boost time by the greater of torque transfer error or tie up error. Since the error due to boost is small, can also adjust starting pressure based on slip times. Overall slip time has higher priority than initial slip time. Must increase starting pressure, because with positive controller effort, it is assumed that if the slip time is short the cause is the controller effort adding too much pressure. If slip time is long, take the largest of controller effort or slip time adjustment since they both indicate not enough starting pressure. |
| 10 | F | F | F | T | F | T | F | F | F | Reduce Boost Time Inc/Dec Onc Strt Prs | Torque transfer error is due to over/under boosting the clutch. Since the error due to boost time is small, can also adjust starting pressure based on slip times. |
| 10A | F | T | F | T | F | T | F | F | F | Reduce Boost Time Dec Onc Strt Prs by larger of controller effort or slip time adjustment | Torque transfer error is due to over/under boosting the clutch. Since the error due to boost is small, can also adjust starting pressure. Must decrease starting pressure, because with negative controller effort, it is assumed that if the slip time is long the cause is the controller effort taking out too much pressure. If slip time is short, take the larger of controller effort or slip time adjustment since they both indicate too much starting pressure. |
| 10B | T | F | F | T | F | T | F | F | F | Reduce Boost Time Inc Onc Strt Prs by larger of controller effort or slip time adjustment | Torque transfer error is due to over/under boosting the clutch. Since the error due to boost is small, can also adjust starting pressure based on slip times. Must increase starting pressure, because with positive controller effort, it is assumed that if the slip time is short the cause is the controller effort adding too much pressure. If slip time is long, take the largest of controller effort or slip time adjustment since they both indicate not enough starting pressure. |
| 11 | F | F | T | F | F | T | F | F | F | Reduce Boost Time Inc/Dec Onc Strt Prs | Torque transfer error is due to over/under boosting the clutch. Since the error due to boost time is small, can also adjust starting pressure based on initial slip times. |
| 11A | F | T | T | F | F | T | F | F | F | Reduce Boost Time Dec Onc Strt Prs | Torque transfer error is due to over/under boosting the clutch. Since the error due to boost is small, can also adjust starting pressure. Controller effort has higher priority than initial slip time. |
| 11B | T | F | T | F | F | T | F | F | F | Reduce Boost Time Inc Onc Strt Prs | Torque transfer error is due to over/under boosting the clutch. Since the error due to boost is small, can also adjust starting pressure. Controller effort has higher priority than initial slip time. |

-continued

POWER-OFF PRIORITY TABLE
Non-Sync. Adaptive Prioritization Rules

| Priority | #8A Positive Controller Effort (adds prs) | #8B Neg Controller Effort (removes prs) | #7 Initial Slip Time Error | #6 Slip Time Error | #5 Tie Up Due to Boost (measured at output shaft) | #4 Small Torque Transfer Time Error | #3 Large Torque Transfer Time Error | #2 Aggressive Ramp Reached | #1 Ratio Change Starts During Boost | Characteristic to Adapt | Rationale |
|---|---|---|---|---|---|---|---|---|---|---|---|
| 12 | F | F | T | T | F | T | F | F | F | Reduce Boost Time Inc/Dec Onc Strt Prs | Torque transfer error is due to over/under boosting the clutch. Since the error due to boost time is small, can also adjust starting pressure based on slip times. Overall slip time has higher priority than initial slip time. |
| 12A | F | T | T | T | F | T | F | F | F | Reduce Boost Time Dec Onc Strt Prs by larger of controller effort or slip time adjustment | Torque transfer error is due to over/under boosting the clutch. Since the error due to boost is small, can also adjust starting pressure. Must decrease starting pressure, because with negative controller effort, it is assumed that if the slip time is long the cause is the controller effort taking out too much pressure. If slip time is short, take the larger of controller effort or slip time adjustment since they both indicate too much starting pressure. Controller effort has higher priority than initial slip time. |
| 12B | T | F | T | T | F | T | F | F | F | Reduce Boost Time Inc Onc Strt Prs by larger of controller effort or slip time adjustment | Torque transfer error is due to over/under boosting the clutch. Since the error due to boost is small, can also adjust starting pressure based on slip times. Must increase starting pressure, because with positive effort, it is assumed that if the slip time is short the cause is the controller effort adding too much pressure. If slip time is long, take the larger of controller effort or slip time adjustment since they both indicate not enough starting pressure. Controller effort has higher priority than initial slip time. |

\* = Don't Care (other conditions take precedence)
N/A = condition not possible - Treat as a don't care The above table lists the measured conditions in the order of their priority. They are listed at the top of the chart in vertical columns 8A through 1, reading from left to right. The first vertical column in the table is a listing of the priority for each of the measured conditions. As indicated, a single measured condition or multiple measured conditions can be used to make an adaptive adjustment in pressure.

The detection of a ratio change during pressure boost has the highest priority, as previously mentioned. If that condition is detected, it is indicated by the letter "T." The characteristic that should be adapted in this circumstance is the reduction of boost pressure time, as indicated in the vertical column under the heading "Characteristic to Adapt." The rationale for the adaptation is indicated in the right-hand column, under the heading "Rationale." For example, a ratio change during boost of pressure on the oncoming friction element indicates that the value of the boost pressure time is significantly high. The solution to that condition is a reduction in boost pressure time, as indicated in the vertical column under the heading "Characteristic to Adapt."

In the priority table, the letter "F" stands for false and the letter "T" stands for true. An adjustment is called for whenever a measured condition is identified by the letter "T."

As indicated previously, if an aggressive ramp is reached during the shift progression, that characteristic has the second highest priority. If an aggressive ramp is detected, the characteristic to adapt, as indicated in the table, is the oncoming friction element starting pressure, which must be increased by a calibrated value. As indicated in the right-hand column, the rationale for that adjustment is that the aggressive ramp indicates low starting pressure. As indicated in the priority table, there may be several measured conditions that will call for a pressure boost time change. In the case of priority #10, for example, both a small error in torque transfer time and a slip time error can be detected. Those errors call for a reduction in boost pressure time and an increase or a decrease in the pressure of the oncoming friction element by a calibrated amount. The rationale for that adjustment is that the torque transfer error is due to over boosting or under boosting the friction element. Since the error in this case due to boost is small, the correction can be made by adjusting the starting pressure based on slip times.

Although an embodiment of the invention has been described, it will be apparent that persons skilled in the art may make modifications without departing from the scope of the invention. All such modifications and equivalents thereof are intended to be covered by the following claims.

What is claimed:

1. An adaptive control method for an electronic ratio shift controller for a multiple-ratio transmission, the transmission comprising gear elements defining plural torque flow paths between a torque input shaft and a torque output shaft, and pressure-actuated friction elements selectively establishing a power-off downshift in gear ratio as an oncoming friction element and an offgoing friction element are applied and released, the downshift having adaptive shift characteristics including pressure boost time as pressure at the oncoming friction element is boosted and starting pressure for the oncoming friction element at the beginning of a ratio change is increased, the control method comprising the steps of:
   monitoring measured operating conditions during a current power-off downshift; and
   adjusting the adaptive shift characteristics for a subsequent downshift as determined by the measured operating conditions, whereby power-off downshift quality is improved;
   the step of adjusting the adaptive shift characteristics being executed in a predetermined order of priority to achieve shift smoothness in a reduced power-off downshift time.

2. An adaptive control method for an electronic ratio shift controller for a multiple-ratio transmission as set forth in claim 1 wherein adjusting the adaptive shift characteristic comprises the steps of:
   detecting a start of a ratio change during a pressure boost for a current downshift; and
   reducing the pressure boost time by a value determined by calibration whereby a torque disturbance at the torque output shaft is avoided during a subsequent downshift.

3. An adaptive control method for an electronic ratio shift controller for a multiple-ratio transmission as set forth in claim 1 wherein adjusting the adaptive shift characteristic comprises the steps of:
   detecting an aggressive ramping of starting pressure on the oncoming clutch during a current shift; and
   increasing oncoming friction element starting pressure whereby an aggressive ramping is eliminated during a subsequent shift.

4. An adaptive control method for an electronic ratio shift controller for a multiple-ratio transmission as set forth in claim 1 wherein adjusting the adaptive shift characteristic comprises the steps of:
   detecting a large torque transfer time error during a current shift; and
   changing pressure boost time to reduce the error during a subsequent shift.

5. An adaptive control method for an electronic ratio shift controller for a multiple-ratio transmission as set forth in claim 1 wherein adjusting the adaptive shift characteristic comprises the steps of:
   detecting a large torque transfer error and a tie up due to pressure boost during a current shift; and
   reducing boost time by the larger of an error in torque transfer time and an error in tie up due to pressure boost during a subsequent shift.

6. An adaptive control method for an electronic ratio shift controller for a multiple-ratio transmission as set forth in claim 1 wherein adjusting the adaptive shift characteristic comprises the steps of:
   detecting a small torque transfer time error during a current shift; and
   changing pressure boost time to reduce the error during a subsequent shift.

7. An adaptive control method for an electronic ratio shift controller for a multiple-ratio transmission as set forth in claim 1 wherein adjusting the adaptive shift characteristic comprises the steps of:
   detecting a small torque transfer time error and detecting a negative controller effort during a current shift; and
   changing pressure boost time to reduce the error during a subsequent shift.

8. An adaptive control method for an electronic ratio shift controller for a multiple-ratio transmission as set forth in claim 1 wherein adjusting the adaptive shift characteristic comprises the steps of:
   detecting a small torque transfer error and a positive controller effort during a current shift; and
   changing pressure boost time to reduce the error during a subsequent shift.

9. An adaptive control method for an electronic ratio shift controller for a multiple-ratio transmission as set forth in claim 1 wherein adjusting the adaptive shift characteristic comprises the steps of:

detecting a small torque transfer error and a tie up due to pressure boost during a current shift; and reducing pressure boost time by the larger of torque transfer time error and tie up during a subsequent shift.

10. An adaptive control method for an electronic ratio shift controller for a multiple-ratio transmission as set forth in claim 1 wherein adjusting the adaptive shift characteristic comprises the steps of:

detecting a small torque transfer time error, a tie up due to boost time and a negative controller effort during a current shift; and reducing pressure boost time by the larger of torque transfer error and error due to tie up and decreasing oncoming friction element starting pressure to reduce controller effort during a subsequent shift.

11. An adaptive control method for an electronic ratio shift controller for a multiple-ratio transmission as set forth in claim 1 wherein adjusting the adaptive shift characteristic comprises the steps of:

detecting a small torque transfer time error and a positive controller effort during a current shift; and reducing pressure boost time by the larger of torque transfer error and a tie up error and increasing oncoming friction element starting pressure to reduce controller effort during a subsequent shift.

12. An adaptive control method for an electronic ratio shift controller for a multiple-ratio transmission as set forth in claim 1 wherein adjusting the adaptive shift characteristic comprises the steps of:

detecting a small torque transfer time error, a tie up due to boost time and a slip time error during a current shift; and reducing pressure boost time by the larger of torque transfer error and tie up error and changing oncoming friction element starting pressure to reduce slip time error during a subsequent shift.

13. An adaptive control method for an electronic ratio shift controller for a multiple-ratio transmission as set forth in claim 1 wherein adjusting the adaptive shift characteristic comprises the steps of:

detecting a small torque transfer error, a tie up due to pressure boost time, a slip time error and negative controller effort during a current shift; and reducing pressure boost time by the larger of torque transfer error and tie up error and decreasing oncoming friction element starting pressure by the larger of controller effort adjustment and slip time adjustment during a subsequent shift.

14. An adaptive control method for an electronic ratio shift controller for a multiple-ratio transmission as set forth in claim 1 wherein adjusting the adaptive shift characteristic comprises the steps of:

detecting a small torque transfer time error, a tie up due to pressure boost time, a slip time error and a positive controller effort during a current shift; and reducing pressure boost time by the larger of torque transfer error and tie up error and increasing oncoming friction element starting pressure by the larger of controller effort and slip time adjustment during a subsequent shift.

15. An adaptive control method for an electronic ratio shift controller for a multiple-ratio transmission as set forth in claim 1 wherein adjusting the adaptive shift characteristic comprises the steps of:

detecting a small torque transfer time error, a tie up due to boost and an initial slip time error during a current shift;

reducing pressure boost time by the larger of the torque transfer error and tie up error and changing oncoming friction element starting pressure to reduce initial slip time error during a subsequent shift.

16. An adaptive control method for an electronic ratio shift controller for a multiple-ratio transmission as set forth in claim 1 wherein adjusting the adaptive shift characteristic comprises the steps of:

detecting a small torque transfer time error, a tie up due to boost, an initial slip time error and a negative controller effort during a current shift; and reducing boost time by the larger of torque transfer error and tie up error and decreasing oncoming friction element starting pressure during a subsequent shift.

17. An adaptive control method for an electronic ratio shift controller for a multiple-ratio transmission as set forth in claim 1 wherein adjusting the adaptive shift characteristic comprises the steps of:

detecting a small torque transfer time error, a tie up due to boost, an initial slip time error and a positive controller effort during a current shift; and reducing boost time by the larger of torque transfer error and tie up error and increasing oncoming friction element starting pressure during a subsequent shift.

18. An adaptive control method for an electronic ratio shift controller for a multiple-ratio transmission as set forth in claim 1 wherein adjusting the adaptive shift characteristic comprises the steps of:

detecting a small torque transfer time error, a tie up due to boost, slip time error, and initial slip time error during a current shift; and reducing boost time by the larger of torque transfer time error and tie up error and changing oncoming friction element starting pressure during a subsequent shift.

19. An adaptive control method for an electronic ratio shift controller for a multiple-ratio transmission as set forth in claim 1 wherein adjusting the adaptive shift characteristic comprises the steps of:

detecting a small torque transfer time error, a tie up due to boost, a slip time error, and initial slip time error and a negative controller effort during a current shift; and reducing boost time by the larger of torque transfer error and tie up error and decreasing starting pressure of the oncoming friction element by the larger of controller effort and slip time adjustment during a subsequent shift.

20. An adaptive control method for an electronic ratio shift controller for a multiple-ratio transmission as set forth in claim 1 wherein adjusting the adaptive shift characteristic comprises the steps of:

detecting a small torque transfer time error, a tie up due to boost, a slip time error, an initial slip time error and a positive controller effort during a current shift; and reducing boost time by the larger of torque transfer time error and tie up error and increasing starting pressure of the oncoming friction element by the larger of controller effort and slip time adjustment during a subsequent shift.

21. An adaptive control method for an electronic ratio shift controller for a multiple-ratio transmission as set forth in claim 1 wherein adjusting the adaptive shift characteristic comprises the steps of:

detecting a small torque transfer time error and a slip time error during a current shift; and reducing boost time and changing oncoming clutch starting pressure based on slip time during a subsequent shift.

22. An adaptive control method for an electronic ratio shift controller for a multiple-ratio transmission as set forth in claim 1 wherein adjusting the adaptive shift characteristic comprises the steps of:
  detecting a small torque transfer time error, a slip time error and a negative controller effort during a current shift; and
  reducing boost time and decreasing oncoming friction element starting pressure by the larger of controller effort and slip time adjustment during a subsequent shift.

23. An adaptive control method for an electronic ratio shift controller for a multiple-ratio transmission as set forth in claim 1 wherein adjusting the adaptive shift characteristic comprises the steps of:
  detecting a small torque transfer time error, a slip time error and a positive controller effort during a current shift; and
  reducing boost time and increasing oncoming friction element starting pressure by the larger of controller effort and slip time adjustment during a subsequent shift.

24. An adaptive control method for an electronic ratio shift controller for a multiple-ratio transmission, the transmission comprising gear elements defining plural torque flow paths between a torque input shaft and a torque output shaft, and pressure-actuated friction elements selectively establishing a power-on downshift in gear ratio as an oncoming friction element and an offgoing friction element are applied and released, the downshift having an adaptive shift characteristic comprising starting pressure for the offgoing friction element at the beginning of a ratio change, the control method comprising the steps of:
  monitoring measured operating conditions during a current power-on downshift; and
  adjusting the adaptive shift characteristic for a subsequent shift as determined by the measured operating conditions, whereby power-on downshift quality is improved;
  the step of adjusting shift characteristics being executed in a predetermined order of priority to achieve shift smoothness in a reduced power-on downshift time.

25. The adaptive control method set forth in claim 24 wherein the measured operating conditions include initial slip time.

26. The adaptive control method set forth in claim 25 wherein the initial slip time is based on adjustment of a starting pressure for the offgoing friction element.

27. The adaptive control method set forth in claim 24 wherein the measured operating conditions include extrapolated slip time.

28. The adaptive control method set forth in claim 27 wherein the extrapolated slip time is based on adjustment of a starting pressure adjustment for the offgoing friction element.

29. The adaptive control method set forth in claim 28 wherein extrapolated slip time is adjusted as a second priority.

30. The adaptive control method set forth in claim 24 wherein the measured operating conditions include incipient ramp time.

31. The adaptive control method set forth in claim 30 wherein the incipient ramp time is based on an adjustment of a starting pressure for the offgoing friction element.

32. The adaptive control method set forth in claim 31 wherein incipient ramp time is adjusted as a first priority.

33. The adaptive control method set forth in claim 24 wherein the measured operating conditions include initial slip time, extrapolated slip time and incipient ramp time.

34. The adaptive control method set forth in claim 33 wherein initial slip time is adjusted as a third priority.

* * * * *